| (12) | United States Patent | (10) Patent No.: | US 9,513,984 B2 |
|---|---|---|---|
| | Wang | (45) Date of Patent: | Dec. 6, 2016 |

(54) HARDWARE SIGNAL LOGGING IN EMBEDDED BLOCK RANDOM ACCESS MEMORY

(71) Applicant: Hewlett-Packard Development Company, L.P., Houston, TX (US)

(72) Inventor: Yang Wang, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 139 days.

(21) Appl. No.: 14/605,384

(22) Filed: Jan. 26, 2015

(65) Prior Publication Data

US 2016/0217021 A1    Jul. 28, 2016

(51) Int. Cl.
G06F 11/00    (2006.01)
G06F 11/07    (2006.01)
G06F 11/34    (2006.01)
G06F 11/30    (2006.01)

(52) U.S. Cl.
CPC ......... *G06F 11/079* (2013.01); *G06F 11/0751* (2013.01); *G06F 11/0787* (2013.01); *G06F 11/3079* (2013.01); *G06F 11/3476* (2013.01)

(58) Field of Classification Search
CPC . G06F 11/079; G06F 11/0787; G06F 11/0751; G06F 11/3013; G06F 11/3065; G06F 11/3079; G06F 11/3476
See application file for complete search history.

(56) References Cited

U.S. PATENT DOCUMENTS

| 6,483,342 | B2 | 11/2002 | Britton | |
|---|---|---|---|---|
| 6,802,026 | B1* | 10/2004 | Patterson | G06F 11/362 |
| | | | | 712/227 |
| 7,187,203 | B1 | 3/2007 | Hume | |
| 7,459,931 | B1 | 12/2008 | Tang | |
| 7,568,074 | B1* | 7/2009 | Kavipurapu | G06F 13/4022 |
| | | | | 711/114 |
| 7,957,208 | B1 | 6/2011 | Tang | |
| 2015/0128100 | A1* | 5/2015 | Foisy | G01R 31/318519 |
| | | | | 716/108 |
| 2016/0217021 | A1* | 7/2016 | Wang | G06F 11/079 |

OTHER PUBLICATIONS

"Reveal User Guide Lattice," Mar. 2014, <http://www.latticesemi.com/~/media/Documents/UserManuals/RZ/Reveal32UserGuide.pdf. >.

Stelios Pantelopoulos, "D2.4—Parallel Hardware System Specifications," May 7, 2012, <http://www.fp7-heap.eu/Public/HEAP_D2_4_FINAL.pdf >.

Xilinx, "Using Block RAM in Spartan-3 Generation FPGAs", XILINX, XAPP463 (v2.0), Mar. 1, 2005, pp. 1-40.

* cited by examiner

*Primary Examiner* — Philip Guyton

(74) *Attorney, Agent, or Firm* — Wall & Tong, LLP

(57) ABSTRACT

A example method is described in which a programmable logic device: samples a first instance of a log data word comprising at least one hardware signal; compares the first instance of the log data word to a previous instance of the log data word; detects a change in the log data word when the first instance of the log data word is different from the previous instance of the log data word; and stores the first instance of the log data word in a storage location in an embedded block random access memory of the programmable logic device when the change in the log data word is detected.

20 Claims, 5 Drawing Sheets

HARDWARE SIGNAL LOGGING IN EMBEDDED BLOCK RANDOM ACCESS MEMORY

BACKGROUND

Computer servers often comprise a chassis containing many identical computing cartridges. Each cartridge may have one or more central processing units (CPUs), an onboard controller, a programmable logic device (PLD), and various other hardware components, along with their corresponding software/firmware programs. After each component is individually developed, there comes a time for system integration, which may involve hardware debugging.

DETAILED DESCRIPTION

Figure 1:
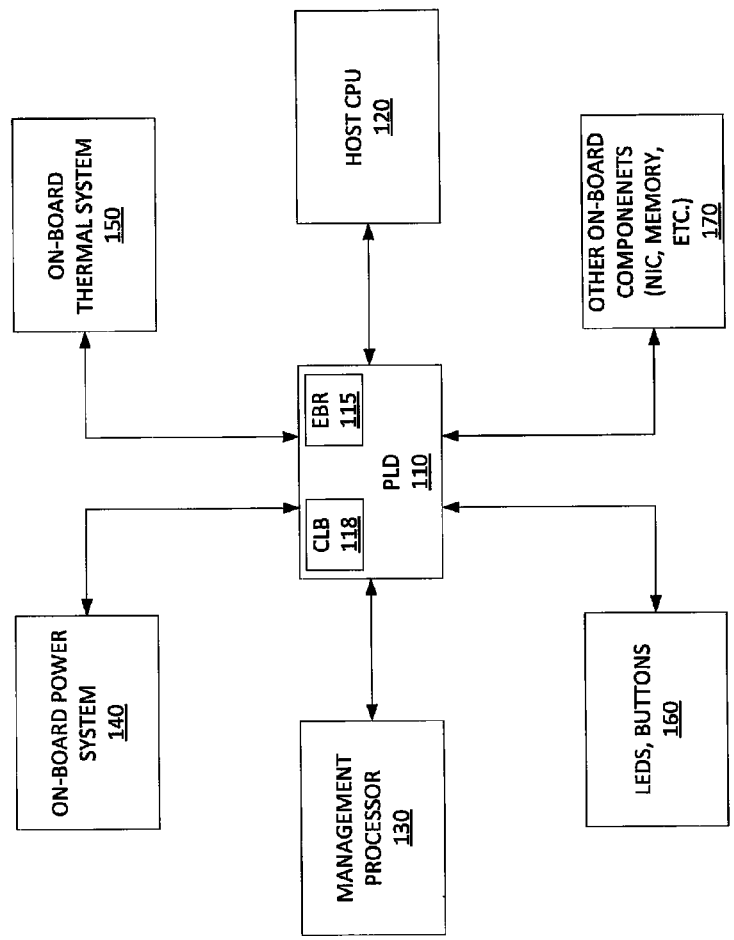
FIG. 1 is a block diagram of an example system, from a PLD point of view, of the present disclosure.

The present disclosure broadly discloses a method, non-transitory machine-readable medium and device for storing hardware signals in an embedded block random access memory (EBR). During the development of computing devices, such as servers, routers, switches and the like, individual hardware components may be developed separately to a certain point. Hardware debugging typically occurs during system integration, when such components are finally brought together. However, hardware debugging at this stage is often difficult insofar as problems may appear randomly in any one of the components, making it difficult to find the source of a problem by conventional means.

A logic analyzer or scope is often used in hardware debugging. However, on computer server systems, a problem may occur in any cartridge in a chassis, where it is not apparent which cartridge is going to fail beforehand. When a bug can be reproduced on one printed circuit board (PCB), it still takes considerable effort to identify the triggering condition, find the relevant signals on the densely packed board, and bring them out of the board before probing can be done. There may also be a limited availability of personnel and equipment, making it even more difficult to catch bugs that only a large sample size can reveal. In addition, team members involved in system development often work at different sites. Therefore, the back and forth for debug requests and responses can take considerable time and effort.

After a problem occurs, test personnel may also look at software logs or hardware registers. However, hardware registers only provide after-the-fact static information. Software has access to large amount of memory, and thus can provide detailed log information. Nevertheless, the software is usually too far removed from the hardware to provide the necessary details. For example, it takes many clock cycles for software to read a signal value from a port. Therefore, software logs have limited value in timing-critical hardware debugging. In general, software also does not have access to many of the hardware signals.

In contrast, embodiments of the present disclosure provide logging of hardware signals in an embedded block RAM (EBR) portion of a programmable logic device (PLD). In a server system, the PLD typically implements reset logic, power sequencing, glue logic, and other functions. Because of its strategic position in the overall system, the PLD has access to many of the hardware signals. Modern PLDs, such as field programmable gate arrays (FPGAs), also typically include embedded block RAM (EBR). If the project of the PLD does not require all of the available EBR, then it is left unused. The present disclosure utilizes the otherwise unused EBR on the PLD. Therefore, logging of hardware signals in accordance with the present disclosure incurs little or no additional cost.

The log is embedded in the PLD hardware and can be placed in the "on" setting continuously, thereby capturing a failure state when it happens. It is especially useful for random board failure among a chassis-full of boards. The set of hardware signals to be logged can be changed since a PLD is a programmable device, making it easy for trial-and-error debugging. Therefore, a tester can pre-program the PLD to log a number of selected signals and the log can be used to quickly make progress in identifying and solving a problem. In addition, when logging hardware signals in EBR, the logging speed can match the speed(s) at which the signals are changing. Thus, EBR-based hardware signal logging is well suited for hardware debugging.

In one example, a portion of the EBR that is otherwise unused is assigned to comprise a hardware signal log, also referred to herein as an "EBR log" or buffer. In one example, the EBR log is organized as a circular buffer. Prior to operation of a system that is under test, it is first determined which hardware signals are to be recorded. For example, a tester may select one or more hardware signals that may help to identify a bug when it happens, such as the state of an internal state machine, signals that cause state transitions, fault signals, status indicator signals, and so forth. A unit for storing hardware signals in the EBR log is referred to herein as a "log data word." A log data word may comprise n-bits, e.g., 8-bits, 16-bits, etc. In one example, the size of the EBR log is conveniently a multiple of the n-bit size of the log data word. In accordance with the present disclosure, all hardware signals that are selected for logging are assigned one or more bit positions within the log data word, as described in greater detail below.

In one example, the hardware signals of the log data word are logged on every clock cycle. This approach has the benefit of knowing the exact timing when a change in a hardware signal occurs. However, this may require a large EBR log/buffer size to capture the whole event. In another example, the log data word is recorded every time that there is a change in any one of the hardware signals in that log data word. This provides the relative timing among the signals and requires a smaller buffer size as compared to logging every clock cycle. In one example, logging enable/disable logic is provided to stop logging upon certain conditions (e.g., when a bug condition happens or based upon a user input signal), to preserve the buffer and to prevent it from being overwritten by new incoming hardware signals of the log data word.

Thus, the present disclosure provides various advantages over prior techniques for hardware signal debugging. For example, logging of hardware signals in an EBR log is flexible: the signals to be logged are programmed into the PLD. It is far easier to select hardware signals and to change the hardware signals of interest as compared to scoping. Logging of hardware signals in an EBR log can also be performed simultaneously on multiple cartridges running in a chassis. In contrast, scoping is usually performed on each cartridge at a time. EBR logging is in-line, and accesses hardware signals that are already passing through the PLD. Nevertheless, the EBR logging is out-of-band and does not interfere with the normal operation of the system. EBR logging can be "always-on," requires no human attendance, and can capture rare failures the first time around. If desired, the EBR log can also be made more accurate down to a single clock cycle. Finally, EBR logging uses components that are already present in existing designs, thereby adding little to no cost in deploying embodiments of the present disclosure.

To aid in understanding the present disclosure, FIG. 1 illustrates an example system 100. System 100 may comprise a cartridge of a server comprising one or more cartridges. As illustrated in FIG. 1, system 100 comprises various components including: a host CPU 120 that may comprise one or more cores, a management processor 130, an on-board power system 140, an on-board thermal system 150, light emitting diodes (LEDs) and user input buttons 160, and other on-board components 170, e.g., an input device, an output device, network interface cards, a memory, power and reset buttons, and so forth.

A programmable logic device (PLD) 110 is coupled to these other components and provides reset logic, power sequencing, glue logic, and other functions. As used herein, the term "coupled" is intended to refer to both direct physical connections between components, e.g., through one or more lines on a printed circuit board (PCB), as well as indirect connections, e.g., by way of one or more intermediate components. Each of the connections between PLD 110 and the other components may comprise a multi-bit wide interface for conveying signals between components. PLD 110 includes an embedded block RAM (EBR) 115 and configurable logic blocks (CLBs) 118. In one example, a portion of EBR 115 is assigned to function as an EBR log for recording hardware signals. In one example, the hardware signals to be logged, the conditions under which to perform the logging and the conditions under which to stop the logging may be implemented as logic within one or more of the CLBs 118.

It should be noted that FIG. 1 has been simplified for ease of explanation. For example, although EBR 115 and CLBs 118 are illustrated as singular and discrete components, it should be appreciated that CLBs 118 may be arranged throughout the PLD 110 and that the EBR 115 may be segregated into a plurality of sections, e.g., where each section is associated with a respective portion of the CLBs 118. Similarly, in one example, one or more of the connections between components may comprise a shared bus, as opposed to independent connections between the PLD 110 and the other respective components. Thus, these and other variations are all contemplated within the scope of the present disclosure. In addition, the example of FIG. 1 is provided for illustrative purposes only. For instance, the present disclosure is not limited to server cartridges and may broadly apply to debugging any other type of device or system that includes a PLD. As such, system 100 may include additional components, such as, an input device, an output device and the like.

Figure 2:
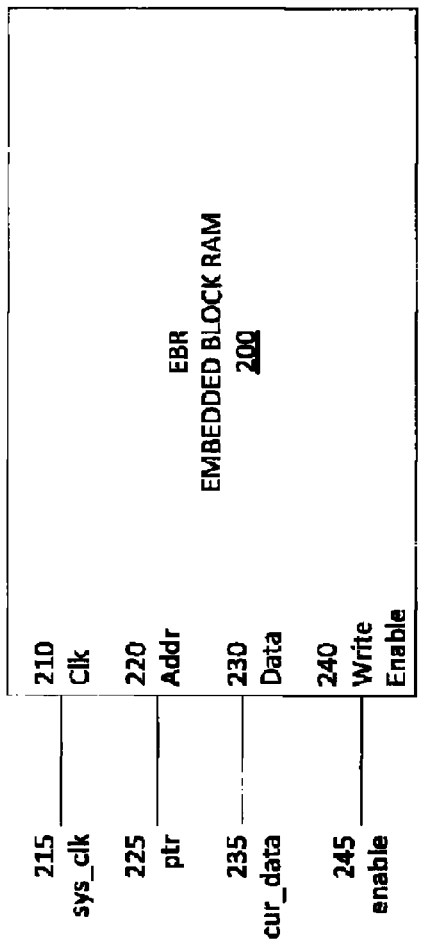
FIG. 2 illustrates an example embedded block random access memory (RAM)

FIG. 2 illustrates a more detailed example of an embedded block RAM (EBR) 200, in accordance with the present disclosure. The EBR 200 may comprise various types of RAM, such as dynamic RAM (DRAM), static RAM (SRAM), synchronous DRAM (SDRAM), double data rate (DRR) SRAM, DDR SDRAM, quad data rate (QDR) SRAM, reduced latency DRAM (RLDRAM), and so forth.

In one example, EBR 200 includes a clock signal input port 210, an address input port 220, a data input port 230, and a write enable input port 240 for receiving control signals, e.g., a system clock 215, an address pointer 225 and an enable signal 245 respectively, as well as a data signal 235. In one example, data signal 235 may comprise a multi-bit data word, also referred to herein as a log data word in connection with the logging of hardware signals in accordance with the present disclosure. Thus, although data input port 230 appears to comprise a single input line, it should be understood that the data input port 230 may comprise a multi-bit wide bus, e.g., a 8-bit wide bus, a 16-bit wide bus, and so forth.

It should be noted that EBR 200 has been simplified for purposes of clarity and illustration. Thus, for example, EBR 200 may also include a data output port, an enable port, and so forth, and may be configured to receive and transmit control and data signals via these additional ports. In addition, EBR 200 is illustrated as being configured with a single clock signal input port 210, a single address input port 220, etc. However, it should be noted that in many applications, an EBR, such as EBR 200, may be separated into two equal or substantially equal block RAMs (BRAMs) with separate clocks, separate data inputs and separate additional control signals. This is often referred to as a "dual-port" configuration. Thus, for instance, if the EBR 200 has a total of 18 Kbit memory locations, the EBR 200 may be configured to function as a "single-port" 18 Kbit BRAM, or two 9 Kbit BRAMs (a "dual-port" configuration). In addition, although a single EBR 200 is illustrated, it should be noted that multiple EBRs may be cascaded together to form an extended memory. For instance, four 18 Kbit EBRs arranged in a single row or column and cascaded together may comprise a 72 Kbit EBR. In addition, a PLD may include multiple columns and/or multiple rows of EBRs. As such, in accordance with the present disclosure, any EBR can be assigned to perform or support functions in connection with the design of the PLD, can be assigned to function as a portion of a log/buffer for storing hardware signals, or can be left unused.

Figure 3:
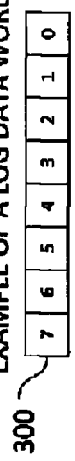
FIG. 3 illustrates an example log data word.
Figure 3:
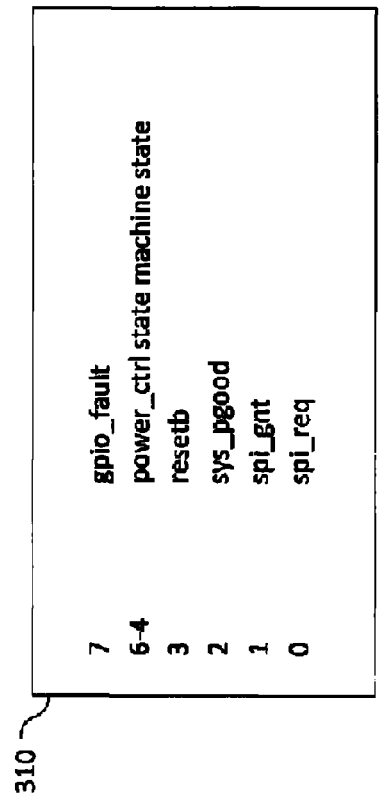

FIG. 3 illustrates an example of a log data word 300, in accordance with the present disclosure. For illustrative purposes, log data word 300 comprises 8 bits, with several different hardware signals (as shown in table 310) being assigned to different bit positions of the log data word 300. For instance, bit 0 is assigned to a request for Serial Peripheral Interface (SPI) read-only memory (ROM) resource signal (spi_req). Bit 1 is assigned to a grant of the SPI ROM resource (spi_gnt) in response to the request signal. Access to a ROM may be shared by a CPU and an onboard controller. Thus, these components may need to request a resource of the ROM and be granted access to the resource via these signals. Bit 2 is assigned to a power to host system monitoring signal (sys_pgood). Bit 3 is assigned to a reset signal to host system (resetb). Bits 4-6 are assigned to a power controller state machine state signal (power_ctrl state machine state). Lastly, bit 7 is assigned to a fault signal from a CPU (gpio_fault).

It should be noted that the assignment of bits in the log data word 300 may be arranged in a different order than the order illustrated in FIG. 3. In addition, one or more of the hardware signals illustrated in log data word 300 may be removed and substituted with a different hardware signal that a tester may desire to log. For instance, a memory controller or a power controller may comprise a state machine with signal values that can be logged in an EBR of a PLD. Thus, in one example, bits 4-6 may be reassigned to state machine state signals for a memory controller. In another example, one of bits 0-7 may be reassigned to a signal that indicates whether a network interface card is busy or in use, a signal that indicates a current operating frequency of a CPU or a memory, and so on.

In one example, the assignment and reassignment of bits to different hardware signals can be accomplished through the programming of configurable logic blocks (CLBs) in a PLD. Thus, in reference to FIG. 1, a tester may configure or program CLBs 118 to log certain hardware signals from the various connected components 120, 130, 140, 150, 160 and 170 into a log/buffer in EBR 115. The system 100 may also be shut down and the CLBs 118 reprogrammed to log different hardware signals when system 100 is restarted. Notably, any hardware signal of a connected component (e.g., an external hardware signal) or any hardware signal generated by the PLD itself (e.g., an internal hardware signal) may be logged in this manner.

Figure 4:
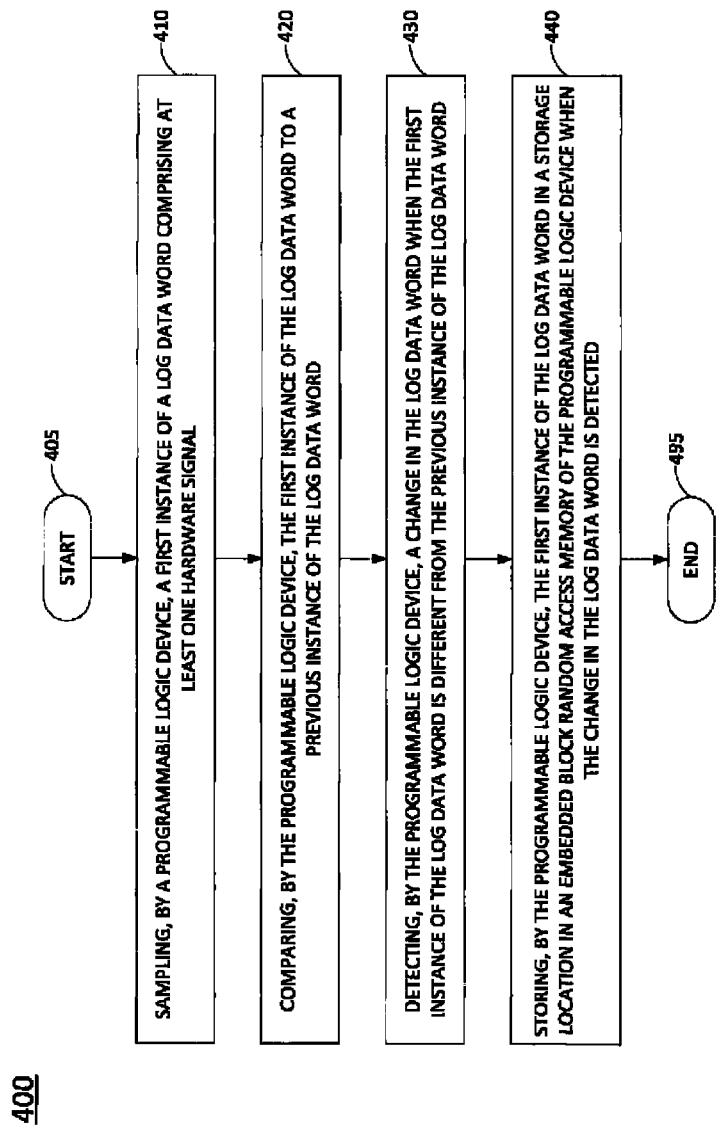
FIG. 4 is an example flowchart of a method for storing hardware signals in an embedded block RAM.

FIG. 4 illustrates a flowchart of a method 400 for storing hardware signals in an embedded block random access memory (EBR). In one example, the method 400 may be performed by a programmable logic device as illustrated in FIG. 1.

At block 405 the method 400 begins. At block 410, the method 400 samples a first instance of a log data word, i.e., the current instance of log data word. In particular, the method 400 samples present values of at least one hardware data signal that comprises the log data word. Notably, hardware signals from external components that pass through the PLD are copied in parallel, which does not affect the normal passing of the hardware signals through the PLD. In addition, as mentioned above, hardware signals that are generated by the PLD itself may also be assigned to the log data word and sampled at block 410. In one example, the current instance of the log data word is sampled on every clock cycle, or periodically every n-th clock cycle. Example hardware signals that may be assigned to the log data word include: a fault signal from a central processing unit, a power system to host system signal, a reset signal to the host system, a resource request signal, a grant of request signal, and so forth.

At block 420, the method 400 compares the first instance of the log data word, i.e., the current instance of the log data word, to a previous instance of the log data word. For example, a previous instance of the log data word may be stored in a buffer in a CLB portion of the PLD.

At block 430, the method 400 detects a change in the log data word when the first instance of the log data word is different from the previous instance of the log data word. In one example, when there is a change in any one bit of the log data word, the method 400 may determine that the first instance of the log data word and the previous instance of the log data word are not equivalent.

At block 440, the method 400 stores the first instance of the log data word in a storage location in an embedded block RAM (EBR) of the PLD. For example, the current instance of the log data word that is sampled at block 410 may be written to a memory location in an EBR log that is referenced by a current address pointer.

Following block 440, the method 400 proceeds to block 495 where the method ends.

Figure 5:
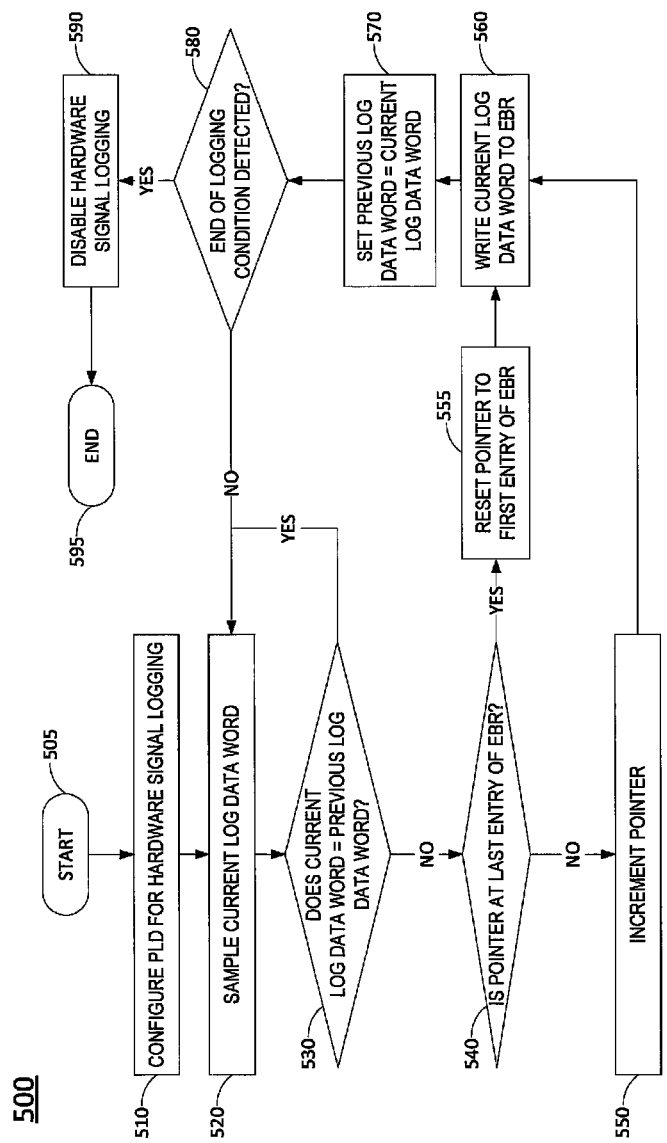
FIG. 5 is an example flowchart of a method for storing hardware signals in an embedded block RAM.

FIG. 5 illustrates a flowchart of an additional method 500 for storing hardware signals in an embedded block random access memory (EBR). In one example, the method 500 may be performed by a programmable logic device as illustrated in FIG. 1.

At block 505 the method 500 begins. At block 510, a programmable logic device (PLD) is configured for hardware signal logging. For example, a configurable logic block (CLB) portion of the PLD may be programmed to pass certain hardware signals from one or more other components in communication with the PLD to a portion of an embedded block RAM (EBR) of the PLD. In one example, the hardware signals are organized into a log data word comprising a number of bits. In one example, the method 500 also sets one or more initial parameters for supporting the logging of hardware signals in the EBR. For instance, the method 500 may initialize a pointer to point to a first address in the EBR that is assigned to the logging of hardware signals. The method 500 may also configure a portion of the CLBs to function as a buffer that stores a previous instance of a log data word. In one example, the method 500 may further configure a portion of the CLBs to function as an additional buffer that stores a first instance, or a current instance of the log data word.

At block 520, the method 500 samples the first instance of a log data word, i.e., the current instance of log data word. In particular, the method 500 samples present values of hardware data signals that comprise the log data word. Notably, hardware signals from external components that pass through the PLD are copied in parallel, which does not affect the normal passing of the hardware signals through the PLD. In addition, as mentioned above, hardware signals that are generated by the PLD itself may also be assigned to the log data word and sampled at block 520. In one example, the current instance of the log data word is sampled on every clock cycle, or periodically every n-th clock cycle. Example hardware signals that may be assigned to the log data word include: a fault signal from a central processing unit, a power system to host system signal, a reset signal to the host system, a resource request signal, a grant of request signal, and so forth. In one example, block 520 may comprise the same or substantially similar operations to those described above in connection with block 410 of the method 400.

At block 530, the method 500 determines whether the current instance of the log data word is equivalent to a previous instance of the log data word. For example, if there is a change in any one bit of the log data word, the method 500 may determine that the current instance of the log data word and the previous instance of the log data word are not equivalent. In one example, block 530 may comprise the same or substantially similar operations to those described above in connection with blocks 420 and 430 of the method 400. If the method 500 determines that the current and previous instances of the log data word are the same, the method 500 returns to step 520 where the method samples a next instance of the log data word. Otherwise, if the method 500 determines that the current and previous instances of the log data word are different, then the method 500 proceeds to block 540.

At block 540, the method 500 determines if an address pointer is at a last entry of an EBR portion that is assigned to log hardware signals. For example, a PLD may include multiple EBRs that may be utilized separately or that may be cascaded to comprise an extended EBR. Each EBR of the PLD may also be dividable for "dual-port" configuration. Thus, as referred to herein, all or a portion of each of the one or more EBRs may be assigned to log hardware signals. Collectively, these assigned portions of the EBRs may be referred to as an EBR log, or EBR buffer. In other words, the EBR log may extend across one or more of the EBR blocks.

If at block 540 it is determined that the address pointer is not at a last entry of the EBR log, the method 500 proceeds to block 550. Otherwise, the method proceeds to block 555.

At block 550, the method 500 increments the address pointer to a next address in the EBR log. In other words, the pointer is advanced to point to a next memory location in the portion of the EBR assigned to log hardware data signals. In one example, the current instance of the log data word may be larger than the data word size of the EBRs (or the width of the read/write interface(s) of the EBRs). For example, the log data word may comprise 56 bits, 64 bits, and so forth, while the EBR data word size may be a lesser amount of 8 bits, 16 bits, etc. Thus, in one example, the address pointer may be advanced by a number of bits equivalent to the size of the log data word. However, the storage locations of the EBRs may alternatively or additionally be data word-addressable. Thus, in another example, the address pointer may be advanced by a value equivalent to the number of native EBR data words that are required to store an entire single log data word. In one example, the writing of the log data word to the EBR log may take more than a single clock cycle. However, it is contemplated that the present method 500 will not necessarily result in writing to the EBR log each clock cycle. Thus, the actual storing of the log data word to the EBR log may extend across several clock cycles (if necessary based upon the data word size of the EBRs).

At block 555, the method 500 resets the address pointer to point to a first address in the EBR log. In other words, the pointer is advanced to point to a first memory location in the portion of the EBR assigned to log hardware data signals. Following either of blocks 550 or 555, the method 500 proceeds to block 560.

At block 560, the method 500 writes the current instance of the log data word to the EBR log. For example, the current instance of the log data word that is sampled at block 520 may be written to a memory location in the EBR log that is referenced by the address pointer. In one example, block 560 may comprise the same or substantially similar operations to those described above in connection with block 440 of the method 400.

At block 570, the method 500 sets the previous instance of the log data word to the current instance of the log data word. For example, a buffer in a CLB portion of the PLD may be overwritten with the current instance of the log data word. Thus, the current instance of the log data word becomes the previous instance of the log data word for a subsequent iteration of blocks 520-570.

At block 580, the method 500 determines whether an end-of-logging condition is detected. In one example, the end-of-logging condition may indicate an anomaly occurred, such as: a power failure signal, an over-temperature signal, a fault signal from a central processing unit, a power system to host system signal, a reset signal to the host system, a resource request signal, a grant of request signal, and so forth. Notably, some of the same hardware signals that may be assigned to a log data word for storing in the EBR log may also be considered as indicators of an anomalous condition. In another example, the condition may comprise a user input signal (which may be consider a special type of external hardware signal), such as a signal indicating a button is pushed or a shutdown command is issued to the CPU, or any other condition that an operator may devise.

If an end-of-logging condition is not detected, the method 500 returns to block 520, where block 520 and the subsequent blocks of the method 500 are repeated with respect to a next instance of the log data word. Otherwise, if an end-of-logging condition is detected, the method 500 proceeds to block 590. It should be noted that while the method 500 is illustrated in flow chart form, the method 500 is implemented in hardware in a CLB portion of a PLD. Thus, blocks 520 through 580 are actually accomplished concurrently in one clock cycle (or however many cycles are used to sample the log word).

In block 590, the method 500 disables hardware signal logging. In other words, the method 500 prevents the storing of any additional instances of the log data word, thereby preventing the potential overwriting of old instances of the log data word in the EBR log with new instances of the log data word. In one example, block 590 comprises toggling an enable signal input to the EBRs from "enable" to "disable" (e.g., from a "1" to a "0," or vice-versa depending upon when the PLD and/or the EBRs comprise active high or active low devices). In another example, the disabling of hardware signal logging is achieved via additional logic within the CLBs. Following block 590, the method 500 proceeds to block 595 where the method ends.

Notably, the contents of the EBR log may be read out following the operations of method 400 or method 500. Advantageously, the EBR log will include the last instance of the log data word prior to or contemporaneous with the end-of-logging condition as well as a number of previous instances of the log data word, up to a capacity of the EBR log or up to a number of instances of the log data word stored in the EBR log prior to the detection of the end-of-logging condition. It should be noted that the methods 400 and 500 are illustrative of just two examples of the present disclosure. As such, it should be appreciated that the present disclosure may be modified or expanded to include various other embodiments. For instance, in another example the EBR log may also include a number of instances of the log data word after the detection of the end-of-logging condition. For example, the PLD may be programmed to continue to store a fixed number of instances of the log data word after the detection of the end-of-logging condition. This may be useful to a tester who is interested in how these hardware signals behave in the times leading up to, during and after the end-of-logging condition.

As a result, examples of the present disclosure improve the functioning of a server, a computer or any hardware device employing a PLD. For example, some prior hardware debugging solutions involve the use of a server or computer to generate software logs, which are generally too far removed from the hardware signals and too slow to provide information that is useful for hardware debugging. Other prior hardware debugging solutions involve a computer or server examining hardware registers, which only provides static information about one point in time, and is of little use when it is not known in advance when a bug will occur. Still other prior hardware debugging solutions utilize a logic analyzer, e.g., a computer, which is difficult to setup and does not work well in the situation of a chassis full of server cartridges.

Thus, existing computers and servers are improved by examples of the present disclosure for storing hardware signals in an embedded block random access memory (EBR) by a programmable logic device (PLD). In other words, the technological art of hardware debugging is improved by providing a computer that is modified with the ability to automatically store hardware signals in an EBR by a PLD, as disclosed by the present disclosure.

It should be noted that although not explicitly specified, one or more blocks, functions, or operations of the methods 400 and 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 4 and 5 that recite a determining operation, or involve a decision, do not necessarily require that both branches of the determining operation be practiced. In other words, one of the branches of the determining operation can be deemed as an optional step.

Figure 6:
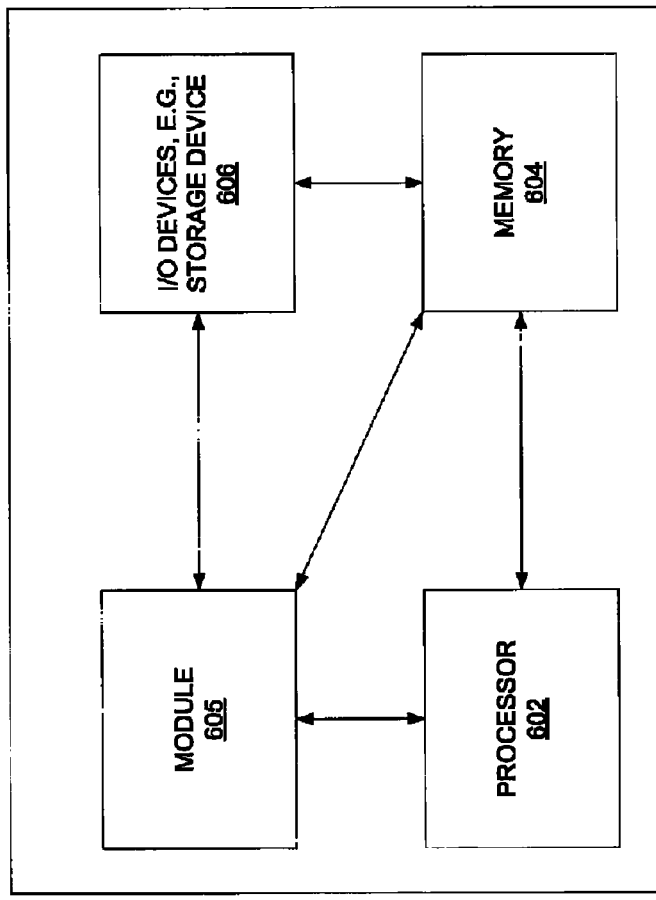
FIG. 6 is an example high-level block diagram of a computing device for use in performing the functions described herein.

FIG. 6 depicts an example high-level block diagram of a computer 600 that comprises a hardware processor element 602, e.g., a central processing unit (CPU), a microprocessor, or a multi-core processor, a memory 604, e.g., random access memory (RAM) and/or read only memory (ROM), a module 605 for storing hardware signals in an embedded block random access memory (EBR) by a programmable logic device (PLD), and various input/output devices 606, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although only one processor element 602 is shown, it should be noted that the computer 600 may employ a plurality of processor elements. Furthermore, although only one computer 600 is shown in the figure, the functions of a single computer 600 may be implemented in a distributed or parallel manner for a particular illustrative example. In such a case, the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented by machine-readable instructions and/or in a combination of machine readable instructions and hardware, e.g., using a programmable logic device (PLD), including a programmable logic array (PLA), a field-programmable gate array (FPGA), a state machine deployed on a hardware device, and the like. For example, machine/computer-readable instructions pertaining to the method(s) discussed above can be used to configure a PLD to perform the steps, functions and/or operations of the above disclosed method (s). In one embodiment, instructions and data for configuring a PLD to perform the steps, functions and/or operations of the above disclosed method(s) can be stored by module 505 for storing hardware signals in an EBR by a PLD, e.g., computer-readable instructions can be loaded into memory 604 and executed by hardware processor element 602 to cause the hardware processor element 602 to program a PLD to perform the steps, functions or operations as discussed above in connection with the exemplary method 600. For example, in order to program a PLD, a Verilog or Hardware Description Language (HDL) code may be created, compiled (on a computer) and used to configure the PLD.

The PLD executing the computer-readable instructions relating to the above described method(s) can be perceived as a programmed processor or a specialized processor. As such, the present module 605 for storing hardware signals in an EBR by a PLD, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server and to be programmed into a PLD.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
sampling, by a programmable logic device, a first instance of a log data word comprising at least one hardware signal;
comparing, by the programmable logic device, the first instance of the log data word to a previous instance of the log data word;
detecting, by the programmable logic device, a change in the log data word when the first instance of the log data word is different from the previous instance of the log data word; and
storing, by the programmable logic device, the first instance of the log data word in a storage location in an embedded block random access memory of the programmable logic device when the change in the log data word is detected.

2. The method of claim 1, where the storage location in the embedded block random access memory is a current storage location of an assigned portion of the embedded block random access memory that is assigned to store instances of the log data word, wherein the current storage location is indicated by a pointer.

3. The method of claim 2, further comprising:
advancing the pointer to a next storage location in the assigned portion of the embedded block random access memory, when the current storage location is not a last storage location in the assigned portion of the embedded block random access memory.

4. The method of claim 2, further comprising:
setting the pointer to a first storage location in the assigned portion of the embedded block random access memory, when the current storage location is a last storage location in the assigned portion of the embedded block random access memory.

5. The method of claim 1, further comprising:
detecting an end-of-logging condition; and
activating a signal for disabling a storage of any new instances of the log data word in the embedded block random access memory.

6. The method of claim 5, wherein the end-of-logging condition is detected upon receiving at least one of:
an internal hardware signal; or
an external hardware signal.

7. The method of claim 1, wherein the at least one hardware signal comprises at least one of:
an internal hardware signal; or
an external hardware signal.

8. The method of claim 1, wherein at least a portion of the programmable logic device comprises glue logic for transmitting and receiving signals from at least one component device on a same board as the programmable logic device.

9. The method of claim 8, wherein the at least one hardware signal is received by the programmable logic device from the at least one component device.

10. A programmable logic device, comprising:
an embedded block random access memory; and
at least one configurable logic block to:
   sample a first instance of a log data word comprising at least one hardware signal;
   compare the first instance of the log data word to a previous instance of the log data word;
   detect a change in the log data word when the first instance of the log data word is different from the previous instance the log data word; and
   store the first instance of the log data word in a storage location in the embedded block random access memory when the change in the log data word is detected.

11. The programmable logic device of claim 10, where the storage location in the embedded block random access memory is a current storage location of an assigned portion of the embedded block random access memory that is assigned to store instances of the log data word, wherein the current storage location is indicated by a pointer.

12. The programmable logic device of claim 11, wherein the at least one configurable logic block is further to:
   advance the pointer to a next storage location in the assigned portion of the embedded block random access memory, when the current storage location is not a last storage location in the assigned portion of the embedded block random access memory.

13. The programmable logic device of claim 11, wherein the at least one configurable logic block is further to:
   set the pointer to a first storage location in the assigned portion of the embedded block random access memory, when the current storage location is a last storage location in the assigned portion of the embedded block random access memory.

14. The programmable logic device of claim 10, wherein the at least one configurable logic block is further to:
   detect an end-of-logging condition; and
   activate a signal for disabling a storage of any new instances of the log data word in the embedded block random access memory.

15. The method of claim 14, wherein the end-of-logging condition is detected upon receiving at least one of:
   an internal hardware signal; or
   an external hardware signal.

16. The programmable logic device of claim 10, wherein the at least one hardware signal comprises at least one of:
   an internal hardware signal; or
   an external hardware signal.

17. The programmable logic device of claim 10, wherein at least a portion of the programmable logic device comprises glue logic to transmit and receive signals from at least one component device on a same board as the programmable logic device.

18. The programmable logic device of claim 16, wherein the at least one hardware signal is received by the programmable logic device from the at least one component device.

19. A non-transitory computer-readable storage medium storing instructions which when executed by a processor, cause the processor to program a programmable logic device to:
   sample a first instance of a log data word comprising at least one hardware signal;
   compare the first instance of the log data word to a previous instance of the log data word;
   detect a change in the log data word when the first instance of the log data word is different from the previous instance the log data word; and
   store the first instance of the log data word in a storage location in an embedded block random access memory when the change in the log data word is detected.

20. The non-transitory computer-readable storage medium of claim 19, wherein the storage location in the embedded block random access memory is a current storage location of an assigned portion of the embedded block random access memory that is assigned to store instances of the log data word, wherein the current storage location is indicated by a pointer.

* * * * *